Patented Oct. 10, 1933

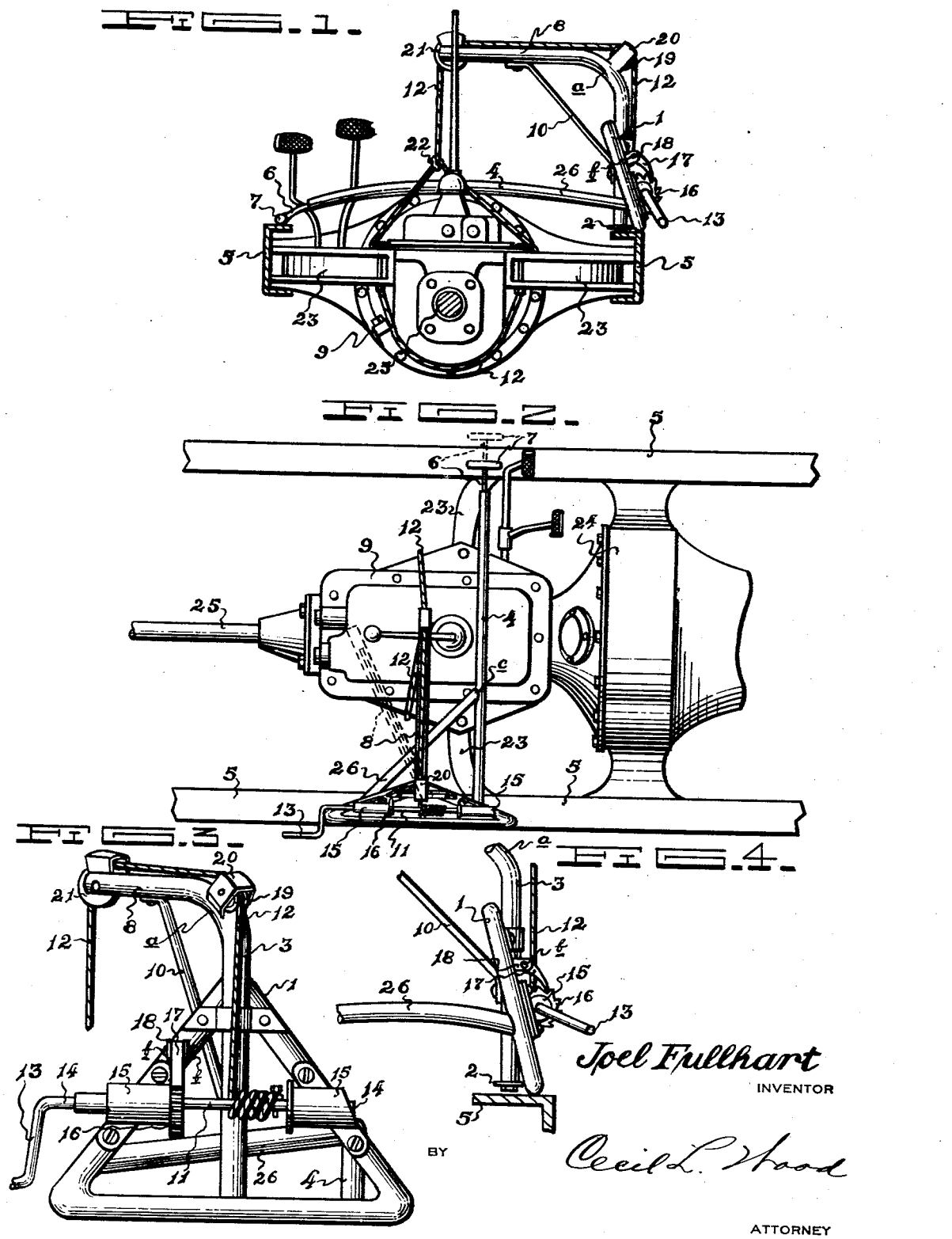

1,929,488

UNITED STATES PATENT OFFICE 1,929,488

HOISTING DEVICE

Joel Fullhart, Fort Worth, Tex.

Application April 30, 1932. Serial No. 608,487

5 Claims. (Cl. 254—145)

This invention relates to hoisting equipment and it has particular reference to an especially designed diminutive hoisting crane for use in garages and motor vehicle repair shops, and its principal object resides in the provision of a device capable of use in the hoisting and removal of transmissions, and the like, from motor vehicles, especially those of the closed type, such as sedans, coupes and motor trucks having cabs, the device being so designed as to enable the removal of such elements from these vehicles without removing the top or cab.

Another object of the invention resides in the provision of a novel combination of elements which will afford a means whereby the transmission assembly, or other heavy units, can be handled with the minimum of effort, reducing the possibility of injury to persons engaged in such work and with more rapidity and ease than can be afforded by the conventional equipment commonly used in motor vehicle repair shops, or the like.

Still another object of the invention resides in the provision of such a device as described capable of disposal upon the frame of the vehicle upon which it is used, spanning the distance between the two parallel members thereof and being capable of adjustment relative to varying frame widths which occur in different makes and designs of motor vehicles.

Broadly, the invention seeks to comprehend the provision of an apparatus, as described, of simple design and inexpensive in structure which can be constructed economically, yet capable of considerable saving in its scope, in connection with repairing, disassembling and assembling motor vehicles, reducing the cost of such labor and minimizing the time required in such work.

While the foregoing objects are paramount, other and lesser objects will become manifest as the description proceeds taken in connection with the appended drawing wherein:

Figure 1 is a vertical cross section of a motor vehicle frame in which the transmission is shown suspended and illustrating the manner in which the invention is installed and manipulated.

Figure 2 is a fragmentary plan view of a conventional motor vehicle frame, showing the invention mounted thereon, its cable surrounding the transmission, the expansible element being shown in dotted lines.

Figure 3 is an elevational view of the windlass and pawl and ratchet arrangement, and Figure 4 is a fragmentary side elevational view of Figure 3 showing the ratchet and pawl arrangement and the crank.

In removing heavy units, such as a transmission assembly, as shown in Figures 1 and 2, it is necessary, according to common practice, to remove the top or cab of the vehicle to enable the use of a conventional shop crane, or similar apparatus. When it is necessary that the transmission unit be taken out without first removing the cab, or body, of the vehicle upon which the work is to be performed, manual labor must be utilized in maintaining the unit in suspension until detached from the vehicle then lowering the same to the ground for repairs. This operation is very often dangerous in that injuries to persons working on the same are sometimes inflicted in performance of such work.

As will be seen by the following description, the invention is constructed preferably of hollow tubing, or pipe which is not only less expensive than other material but affords greater strength and durability.

Accordingly, the invention is comprised primarily of a substantially triangular shaped frame 1, the latter being constructed of hollow tubing which may be cut into sections and welded, or otherwise assembled in such form, as shown in Figure 3. A support 2 is provided intermediate the lower corners of frame 1, projecting outward to afford a bearing for a vertically disposed rotatable standard 3, illustrated in Figure 3.

Referring to Figure 1, it will be seen that the frame 1 is disposed at a slight angle relative to the vertical standard 3, the latter being arranged through the frame 1 in such a manner as to engage the top of the latter on one side and be pivotally mounted upon the support 2.

Particular attention is directed to Figure 2 in which a plan view of the invention is shown. A tubular arm 4, the latter being integral, or rigidly affixed to one of the diverging side members of the frame 1, extends at right angles from the latter to support the same in normal upright position, while in use in connection with a motor vehicle frame 5.

When the invention is operably disposed upon the frame members 5 the substantially triangular frame 1 of the invention is arranged longitudinally along one of the parallel frame members 5 while the arm 4 extends transversely of the latter, its free end being supported by the opposite frame member 5.

As shown in Figure 2, the arm 4 is expansible and contractible in order that its length may be adjusted relative to the distance between the frame members of different makes and types of motor vehicles, some of the said frames being narrower than others necessitating such variation in adjustment in the arm 4, the latter being constructed preferably of hollow tubing, is provided with a sliding rod 6 telescopically and slidably disposed within the arm 4 in order that it may be withdrawn from the latter and returned therein according to the length required of the arm 4 to span the distance between the two parallel members 5 of a motor vehicle frame. An integral cross member 7 is provided at the free end of the rod 6 to bear against the frame member 5, as illustrated in Figures 1 and 2.

The vertical standard 3, previously referred to, is bent at $a$ to provide a horizontal arm 8 which latter extends transversely of the frame 5 of the vehicle, as shown in Figures 1 and 2, and terminates at a point immediately above the transmission assembly 9. The horizontal arm 8 is supported by a suitable brace 10.

A windlass, having a shaft 11 is mounted upon the frame 1, as illustrated in Figure 3, upon which a cable 12 is wound by means of a crank 13. The shaft 14 of the windlass is rotatably disposed within the bearings 15 secured to the frame 1.

A ratchet 16 is rigidly attached to the shaft 11 adjacent to one of the bearings 15, as shown in Figure 3, and is restrained from movement in one direction by a pawl 17, the latter being pivotally mounted between two bearings 18 by means of a bolt or rivet $b$.

The cable 12 extends upward from the shaft 11 over a grooved pulley 19 rotatably mounted within the housing 20, the latter being arranged upon the outer periphery of the bend $a$ as shown in Figure 3 whereupon it extends along the upper surface of the arm 8 to the end thereon, thence over another grooved pulley 21, pivoted within the end of the arm 8, thence downward and around the transmission assembly 9 and secured by a suitable hook 22, or the like.

In operation, therefore, the invention is arranged, as previously stated, transversely on the frame 3 of a vehicle so that the frame 1 of the invention will rest on one of the parallel frame members 5 while the cross member 7 in the free end of the arm 4 rests upon the opposite frame 5 as illustrated in Figures 1 and 2. The pawl 17 is removed from the teeth of the ratchet 16 and hereupon the shaft 11 is rotated by the crank 13 to allow the free end of the cable 12 to drop downward sufficiently to enable it to surround the transmission 9 hereupon it is secured thereon by means of a hook 22. The pawl 17 is again allowed to engage the teeth of the ratchet 16 and the slack in the cable is taken up by rotating the shaft 11. The cable 12 is sufficiently tightened to relieve the weight of the transmission 9 upon its supporting brackets 23 in order that it may be detached therefrom.

After the transmission assembly 9 has been detached from the fly-wheel housing 24, the shaft 25 and the brackets 23, it can be lowered to the ground beneath the vehicle where it can be more easily accessible.

It is pointed out that, by reference to Figure 2, the arm 8 is capable of oscillation in order to enable the operator to swing the transmission assembly 9 toward the rear of the vehicle a sufficient distance to cause the withdrawal of the end of the drive shaft (not shown) from the fly-wheel and fly-wheel housing 24. The lateral movement of the arm 8 is shown in dotted lines in Figure 2, such movement being possible by reason of the pivot of the arm 3 upon the bearing 2, previously referred to.

Obviously, by extending the arm 4 from one side of the frame 1 of the invention, the operations of the arm 8 will not interfere with, it being desirable, for the proper balancing of the weight of the transmission assembly 9, to center the arm 8 with respect to the frame 1 so that the weight supported by the arm 8 will be centralized in the frame 1 which is provided with a liberal base section. The arm 4 is further strengthened by means of an angular brace 26 extending from the opposite side of the frame 1 from that from which the arm 4 extends, and joins the latter at $c$, as shown in Figure 2.

Though the invention has been described with great particularity, certain adjustments and modifications may be resorted to from time to time without departing from the spirit and intent of the invention and which may be also considered within the scope of the appended claims.

What is claimed is:

1. A hoist for use in removing the transmission assembly from motor vehicles capable of being supported by the frame members of a motor vehicle, including a substantially triangular shaped frame, a contractible and expansible arm extending laterally from said frame, an oscillating arm pivotally mounted in said frame, a cable operatively disposed over grooved pulleys arranged upon the said oscillating arm and a windlass upon which the said cable is wound.

2. A hoist capable of disposal transversely of the frame of a motor vehicle comprising a frame, a lateral, contractible, and expansible arm extending from said frame, an oscillating arm pivotally connected in the said frame, a cable operatively disposed in grooved pulleys in the said oscillating arm, a windlass having a ratchet and detent, means whereby the said cable can be arranged around a transmission assembly so that the latter can be raised and lowered with respect to the drive shaft of the said motor vehicle.

3. A hoisting device for transmissions of motor vehicles, a frame having an adjustable lateral arm extending therefrom, a substantially inverted L-shaped member pivoted for oscillating movement within the said frame, a windlass rotatably mounted in bearings on the said frame, a cable operatively extending along the horizontal and vertical sections of the said L-shaped member capable of being wound upon the said windlass.

4. A hoist capable of being mounted upon the parallel frame members of a motor vehicle comprising a substantially triangular shaped frame, and a longitudinally adjustable arm extending laterally from the said frame capable of transverse arrangement relative to the said parallel frame members of the said motor vehicle, an oscillating arm having grooved pulleys arranged thereon, the said arm being pivoted in the said frame and terminating approximately mid-way between the said motor vehicle frame members, a cable operatively disposed within said grooved pulleys and a windlass capable of receiving the said cable.

5. A hoist for motor vehicle parts capable of arrangement transversely of a motor vehicle frame comprising a frame, a horizontally disposed arm pivotally mounted in said frame, a cable arranged along the upper surface of the said horizontal arm, its free end capable of surrounding the transmission assembly of a motor vehicle, a windlass capable of receiving the opposite end of the said cable and a longitudinally adjustable arm extending laterally from the said frame and transversely of the said motor vehicle frame.

JOEL FULLHART.